US009507994B1

(12) United States Patent
Chiang et al.

(10) Patent No.: US 9,507,994 B1
(45) Date of Patent: Nov. 29, 2016

(54) FINGERPRINT RECOGNITION METHODS AND ELECTRONIC DEVICE

(71) Applicant: Egis Technology Inc., Taipei (TW)

(72) Inventors: Yuan-Lin Chiang, Taipei (TW); Yu-Chun Cheng, Taipei (TW)

(73) Assignee: Egis Technology Inc., Taipei (TW)

( * ) Notice: Subject to any disclaimer, the term of this patent is extended or adjusted under 35 U.S.C. 154(b) by 0 days.

(21) Appl. No.: 14/825,086

(22) Filed: Aug. 12, 2015

Related U.S. Application Data

(63) Continuation-in-part of application No. 14/691,178, filed on Apr. 20, 2015.

(60) Provisional application No. 62/156,450, filed on May 4, 2015, provisional application No. 62/052,162, filed on Sep. 18, 2014.

(51) Int. Cl.
*G06K 9/00* (2006.01)
*G06K 9/03* (2006.01)

(52) U.S. Cl.
CPC ....... *G06K 9/00087* (2013.01); *G06K 9/00013* (2013.01); *G06K 9/033* (2013.01)

(58) Field of Classification Search
None
See application file for complete search history.

(56) References Cited

U.S. PATENT DOCUMENTS

| 5,040,223 A * | 8/1991 | Kamiya | G07C 9/00087 382/127 |
| 6,125,192 A * | 9/2000 | Bjorn | G06F 21/32 340/5.83 |
| 2002/0164058 A1* | 11/2002 | Aggarwal | G06F 21/305 382/125 |
| 2007/0230754 A1* | 10/2007 | Jain | G06K 9/00093 382/125 |

FOREIGN PATENT DOCUMENTS

JP    EP 1840794 A2 *  10/2007  .............. G06F 21/32

* cited by examiner

*Primary Examiner* — Jayesh A Patel

(57) ABSTRACT

An electronic device and fingerprint-recognition method are provided. The method includes: transmitting first part registered fingerprint datasets to the first processing unit; obtaining second part registered fingerprint datasets; obtaining a verification fingerprint image; transmitting the verification fingerprint image to the first processing unit to generate verification fingerprint data; dividing the verification fingerprint data into first part and second part verification fingerprint data; comparing the verification fingerprint data with the registered fingerprint datasets to generate a first matching result and matching information; transmitting the first matching result, the first part verification fingerprint data and the matching information to the second processing unit; comparing the first part verification fingerprint data with one of the first part registered fingerprint datasets to generate a second matching result according to the matching information; and comparing the first matching result and the second matching result to verify the verification fingerprint data.

12 Claims, 13 Drawing Sheets

FINGERPRINT RECOGNITION METHODS AND ELECTRONIC DEVICE

CROSS REFERENCE TO RELATED APPLICATIONS

This Application is a Continuation-In-Part of pending U.S. patent application Ser. No. 14/691,178 filed on Apr. 20, 2015. This Application claims priority of Provisional Patent Application No. 62/052,162, filed on Sep. 18, 2014 and Provisional Patent Application No. 62/156,450, filed on May 4, 2015, the entirety of which is incorporated by reference herein.

BACKGROUND OF THE INVENTION

1. Field of the Invention

The invention generally relates to fingerprint recognition technology, and more particularly, to a method of generating fingerprint matching information in high-performance environment and generating a fingerprint matching result in high-security environment by referring to the matching information.

2. Description of the Related Art

In recent years, biometric recognition technology has developed greatly. Since security codes and access cards may be easily stolen or lost, more and more attention has been paid to fingerprint-recognition technology. Fingerprints are unique and never-changing, and each person has multiple fingers for identity recognition. In addition, fingerprints can be easily obtained through fingerprint sensors. Therefore, fingerprint recognition can provide increased security and convenience, and financial security and confidential data can be better protected.

The computing environment of electronic devices, such as wireless devices, mobile phones, personal communication service (PCS) phones, cordless phones, session initiation protocol (SIP) phones, notebooks, and personal digital assistants (PDAs), can be divided into a high-performance environment and a high-security environment. A high-performance environment has higher computing performance but less security. A high-security environment, such as a Trust-Zone or Security Element, has higher security but less computing performance.

When performing fingerprint recognition, the user may swipe or press his or her finger over or on the fingerprint sensor, and then the fingerprint sensor will capture the verification fingerprint image for fingerprint recognition. If the fingerprint recognition is performed in a high-performance environment, the registration fingerprint data and/or the matching result may be tampered with. In addition, when the verification fingerprint data matches with the registration fingerprint data, the matching result may be overwritten. Therefore, the fingerprint recognition may be performed in a high-security environment (e.g. Trust-Zone or Security Element) for increasing security and reliability of fingerprint recognition. However, when fingerprint recognition is performed in in a high-security environment, the computation capability of the high-security environment is very limited so that the computing performance for fingerprint recognition may be poor.

BRIEF SUMMARY OF THE INVENTION

A fingerprint recognition method and device are provided to overcome the aforementioned problems.

An embodiment of the invention provides a fingerprint recognition method. The fingerprint recognition method is applied to an electronic device, the electronic device comprising a storage unit, a Trust-Zone comprising a first processing unit and a Security Element comprising a second processing unit. The fingerprint recognition method comprises the steps of transmitting first part registered fingerprint datasets to the first processing unit by the second processing unit; obtaining second part registered fingerprint datasets from the storage unit by the first processing unit; obtaining complete registered fingerprint datasets according to the first part registered fingerprint datasets and the second part registered fingerprint datasets; obtaining a verification fingerprint image; transmitting the verification fingerprint image to the first processing unit; generating verification fingerprint data according to the verification fingerprint image by the first processing unit; dividing the verification fingerprint data into first part verification fingerprint data and second part verification fingerprint data; comparing the verification fingerprint data with the registered fingerprint datasets to generate a first matching result and matching information by the first processing unit; transmitting the first matching result, the first part verification fingerprint data and the matching information from the first processing unit to the second processing unit; comparing the first part verification fingerprint data with one of the first part registered fingerprint datasets to generate a second matching result by the second processing unit according to the matching information; and comparing the first matching result and the second matching result so as to verify the verification fingerprint data by the second processing unit.

An embodiment of the invention provides an electronic device. The electronic device comprises a fingerprint sensor, a Trust-Zone, a first storage unit and a Security Element. The fingerprint sensor is configured to obtain a verification fingerprint image. The Trust-Zone comprises a first processing unit. The first processing unit is configured to receive the verification fingerprint image from the fingerprint sensor, generate verification fingerprint data according to the verification fingerprint image, and divide the verification fingerprint data into a first part verification fingerprint data and a second part verification fingerprint data. The first storage unit is configured to store second part registered fingerprint datasets and provide the second part registered fingerprint datasets to the first processing unit. The Security Element comprises a second storage unit and a second processing unit. The second storage unit is configured to store first part registered fingerprint datasets. The second processing unit is configured to transmit the first part registered fingerprint datasets to the first processing unit. The first processing unit further obtains complete registered fingerprint datasets according to the first part registered fingerprint datasets and the second part registered fingerprint datasets. The first processing unit compares the verification fingerprint data with the registered fingerprint datasets to generate a first matching result and matching information and transmits a first part of the first matching result, the first part verification fingerprint and the matching information to the second processing unit. The second processing unit compares the first part verification fingerprint data with one of the first part registered fingerprint datasets to generate a second matching result according to the matching information and compares the first matching result and the second matching result so as to verify the verification fingerprint data by the second processing unit.

Other aspects and features of the invention will become apparent to those with ordinary skill in the art upon review of the following descriptions of specific embodiments of communication transmission methods and systems.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
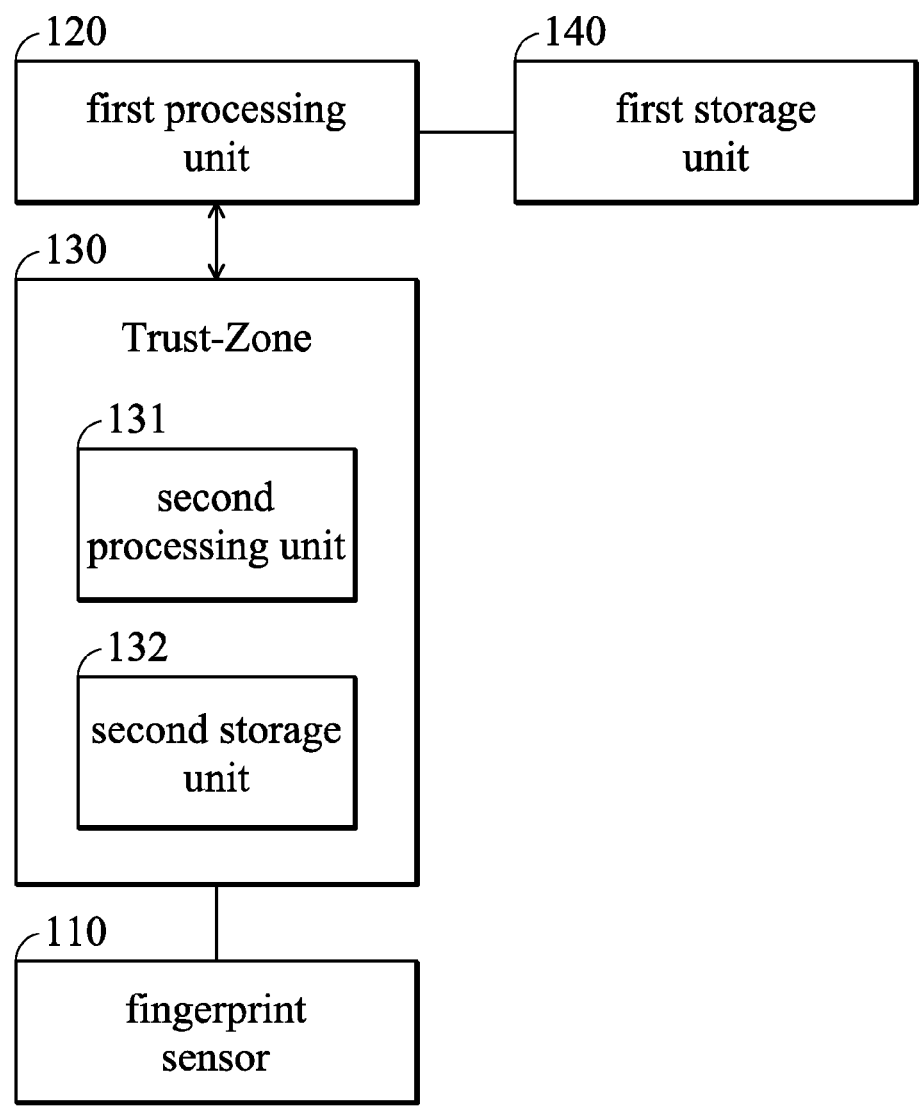
FIG. 1 is a block diagram illustrating an electronic device according to an embodiment of the invention.

FIG. 1 is a block diagram illustrating an electronic device 100 according to an embodiment of the invention. As shown in FIG. 1, the electronic device 100 comprises a fingerprint sensor 110, a first processing unit 120 and a Trust-zone 130, and a storage unit 140. In the embodiment of the invention, the Trust-Zone 130 is based on ARM's® Trust-Zone® technology. The Trust-Zone 130 is an isolated execution environment that guarantees and protects the confidentiality and integrity of the stored-inside code and data. Generally, the Trust-Zone 130 offers an execution space that provides a higher level of security than a rich mobile operating system (mobile OS) and more functionality and computation ability than a secure element (SE). In the embodiment of the invention, the Trust-Zone 130 comprises a second processing unit 131 and a second storage unit 132. The second storage unit 132 may be a non-volatile memory which includes one or more fingerprint databases recording fingerprint information of a user, e.g. a plurality of registered fingerprint datasets. FIG. 1 presents a simplified block diagram in which only the elements relevant to the invention are shown. However, the invention should not be limited to what is shown in FIG. 1.

In an embodiment of the invention, for fingerprint recognition, the user has to swipe or press his or her finger over or on the sensing area of the fingerprint sensor 110. After the user swipes or presses his or her finger on the sensing area of the fingerprint sensor 110, the fingerprint sensor 110 will sense a verification fingerprint image and the verification fingerprint image will be transmitted to the Trust-zone 130. After obtaining the verification fingerprint image, the second processing unit 131 will generate verification fingerprint data according to the verification fingerprint image. Then the second processing unit 131 transmits the verification fingerprint data and the plurality of registered fingerprint datasets stored in the second storage unit 132 to the first processing unit 120.

Figure 2:
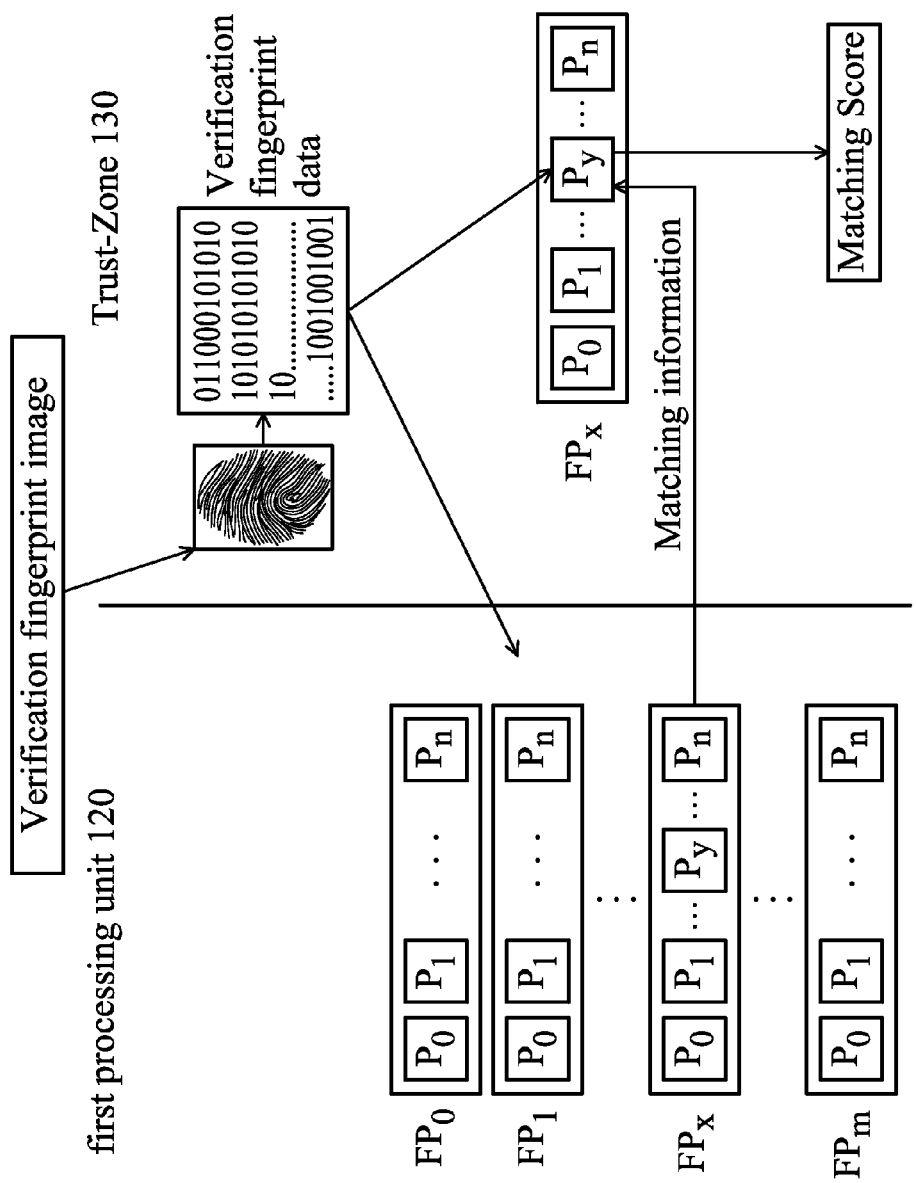
FIG. 2 is a schematic diagram of a fingerprint recognition scheme for a Trust-zone according to an embodiment of the invention.

In an embodiment of the invention, after obtaining the verification fingerprint data and the plurality of registered fingerprint datasets from the second processing unit 131, the first processing unit 120 will compare the verification fingerprint data with the plurality of registered fingerprint datasets to obtain a matching fingerprint template from one of the plurality of registered fingerprint datasets. The first processing unit 120 will also transmit matching information corresponding to the matching fingerprint template to the second processing unit 131. The matching information may include information of rotation and offset between the verification fingerprint data and the matching fingerprint template. For example, as shown in FIG. 2, the first processing unit 120 compares the verification fingerprint data to the registered fingerprint datasets $FP_0, FP_1, \ldots FP_m$, wherein each registered fingerprint dataset $FP_k$ (k=0~m) corresponds to one finger and each registered fingerprint dataset $FP_k$ comprises a plurality of fingerprint templates $p_0, p_1, \ldots, p_n$, wherein n indicates the number of the fingerprint templates in each registered fingerprint dataset $FP_k$. After comparing the verification fingerprint data to the registered fingerprint datasets $FP_0, FP_1, \ldots FP_m$, the first processing unit 120 finds that the fingerprint template $p_y$ included in the registered fingerprint dataset $FP_x$ matches the verification fingerprint. Then, the first processing unit 120 will transmit the matching information corresponding to the matching fingerprint template $p_y$ to the second processing unit 131. The matching information comprises the index of the matching fingerprint template $p_y$ included in the registered fingerprint dataset $FP_x(x)$ and the matching details of the matching fingerprint template $p_y$, such as the offset information and rotation information between the verification fingerprint data and matching fingerprint template $p_y$.

After obtaining the matching information corresponding to the matching fingerprint template $p_y$ from the first processing unit 120, the second processing unit 131 will compare the verification fingerprint data with the matching fingerprint template $p_y$ according to the matching information corresponding to the matching fingerprint template $p_y$ so as to generate a matching score. Then, the second processing unit 131 determines whether the matching score is greater than a threshold. The second processing unit 131 will determine that the verification fingerprint is verified, if the matching score is greater than the threshold. The second processing unit 131 will determine that the verification fingerprint is not verified if the matching score is less than the threshold.

Because the second processing unit 131 has obtained the matching information which identifies the matching fingerprint template $p_y$, the second processing unit 131 doesn't need to compare the verification fingerprint data with other fingerprint templates (e.g. $p_0$, $p_1$) in the registered fingerprint dataset $FP_x$ and the fingerprint templates in other registered fingerprint datasets (e.g. $FP_0$, $FP_1$, $FP_m$). Therefore, the security and liability of fingerprint recognition can be promoted since the matching score (i.e. matching result) is provided by Trust-zone 130, the high security environment.

Figure 3:
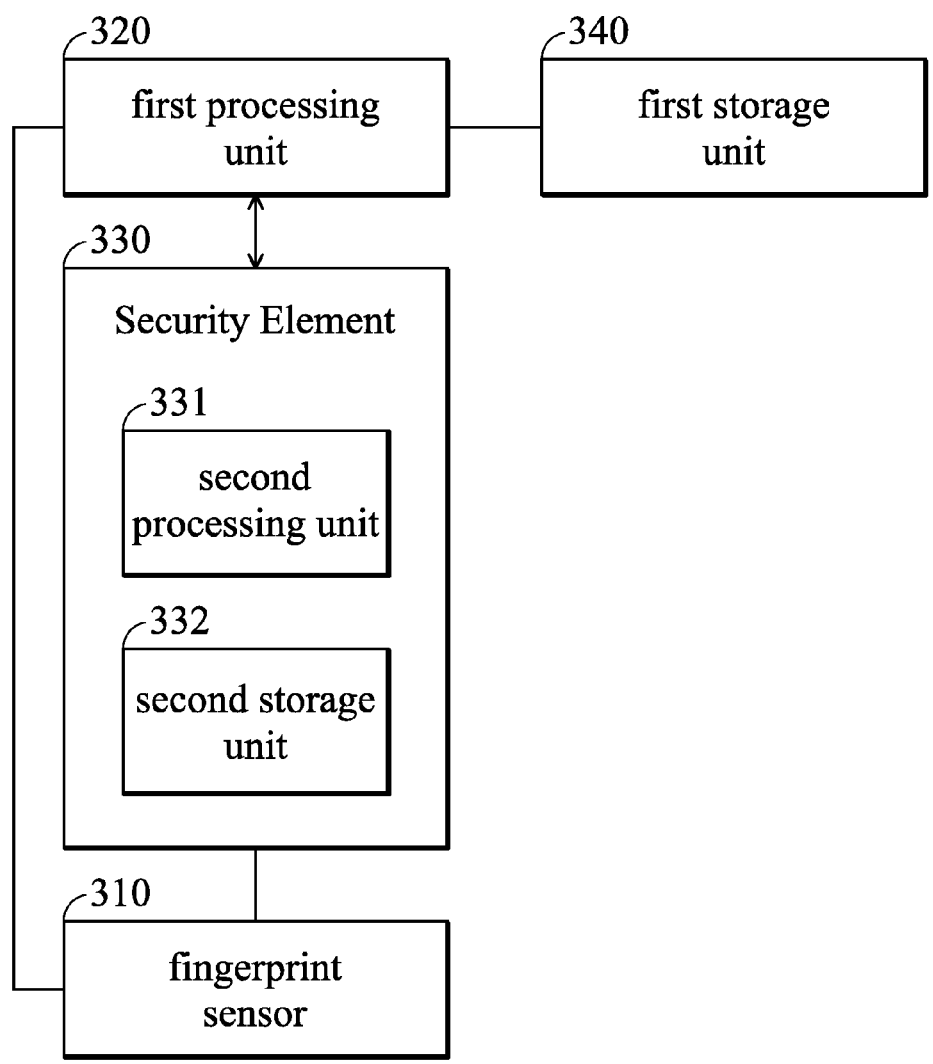
FIG. 3 is a block diagram illustrating an electronic device according to another embodiment of the invention.

FIG. 3 is a block diagram illustrating an electronic device 300 according to another embodiment of the invention. As shown in FIG. 3, the electronic device 300 comprises a fingerprint sensor 310, a first processing unit 320, a Security Element 330, and a first storage unit 340. FIG. 3 presents a simplified block diagram in which only the elements relevant to the invention are shown. However, the invention should not be limited to what is shown in FIG. 3.

In this embodiment of the invention, in FIG. 3, the Security Element 330 is a tamper-resistant platform (typically a one chip secure microcontroller) capable of securely hosting applications and their confidential and cryptographic data (e.g. key management) in accordance with the rules and security requirements set forth by a set of well-identified trusted authorities. In an embodiment, the Security Element 330 comprises a second processing unit 331 and a second storage unit 332. The second processing unit 331, for example, may be a central processing unit (CPU) or a microcontroller. The second storage unit 332 may be a non-volatile memory which includes one or more fingerprint databases recording fingerprint information of a user, e.g. a plurality of registered fingerprint datasets. Note that because the Trust-Zone 130 of FIG. 1 offers an execution space that provides a higher level of computation ability than a secure element (SE), the Trust-zone 130 is configured to generate the verification fingerprint data according to the verification fingerprint image. For example, the Trust-zone 130 is configured to calculate the feature points in the verification fingerprint image so as to generate the verification fingerprint data. However, in the embodiment of FIG. 3, the computation ability of the Security Element 330 is relatively less than the Trust-zone 130. Thus, the Security Element 330 is configured to calculate the feature points in a portion of the verification fingerprint image, rather than the entire image. In other words, the Security Element 330 is configured to generate partial verification fingerprint data corresponding to a portion of the verification fingerprint image. On the other hand, the first processing unit 320 will generate the verification fingerprint data corresponding to the entire verification fingerprint image and provide the verification fingerprint data to the Security Element 330 Then, the Security Element 330 will use the partial verification fingerprint data generated by itself to verify the verification fingerprint data generated by the first processing unit 320. The detailed description will be illustrated as follow.

In the embodiment of the invention, for fingerprint recognition, the user has to swipe or press his or her finger over or on the sensing area of the fingerprint sensor 310. After the user swipes or presses his or her finger over or on the sensing area of the fingerprint sensor 310, the fingerprint sensor 310 will sense a verification fingerprint image and the verification fingerprint image will be transmitted to the Security Element 330 and to the first processing unit 320.

The first processing unit 320 will generate first verification fingerprint data according to the verification fingerprint image after obtaining the verification fingerprint image. Then, the first processing unit 320 transmits the first verification fingerprint data to the second processing unit 331.

After obtaining the verification fingerprint image, the second processing unit 331 will generate second verification fingerprint data according to the verification fingerprint image. Then second processing unit 331 will compare the second verification fingerprint data with the first verification fingerprint data which is transmitted from the first processing unit 320 to determine whether the second verification fingerprint data appears in the first verification fingerprint data.

If the second verification fingerprint data appears in the first verification fingerprint data, the second processing unit 331 will determine that the first verification fingerprint data from the first processing unit 320 is reliable. If the second verification fingerprint data does not appear in the first verification fingerprint data, the second processing unit 331 will determine that the first verification fingerprint data from the first processing unit 320 is not reliable and terminate the fingerprint recognition.

Figure 4:
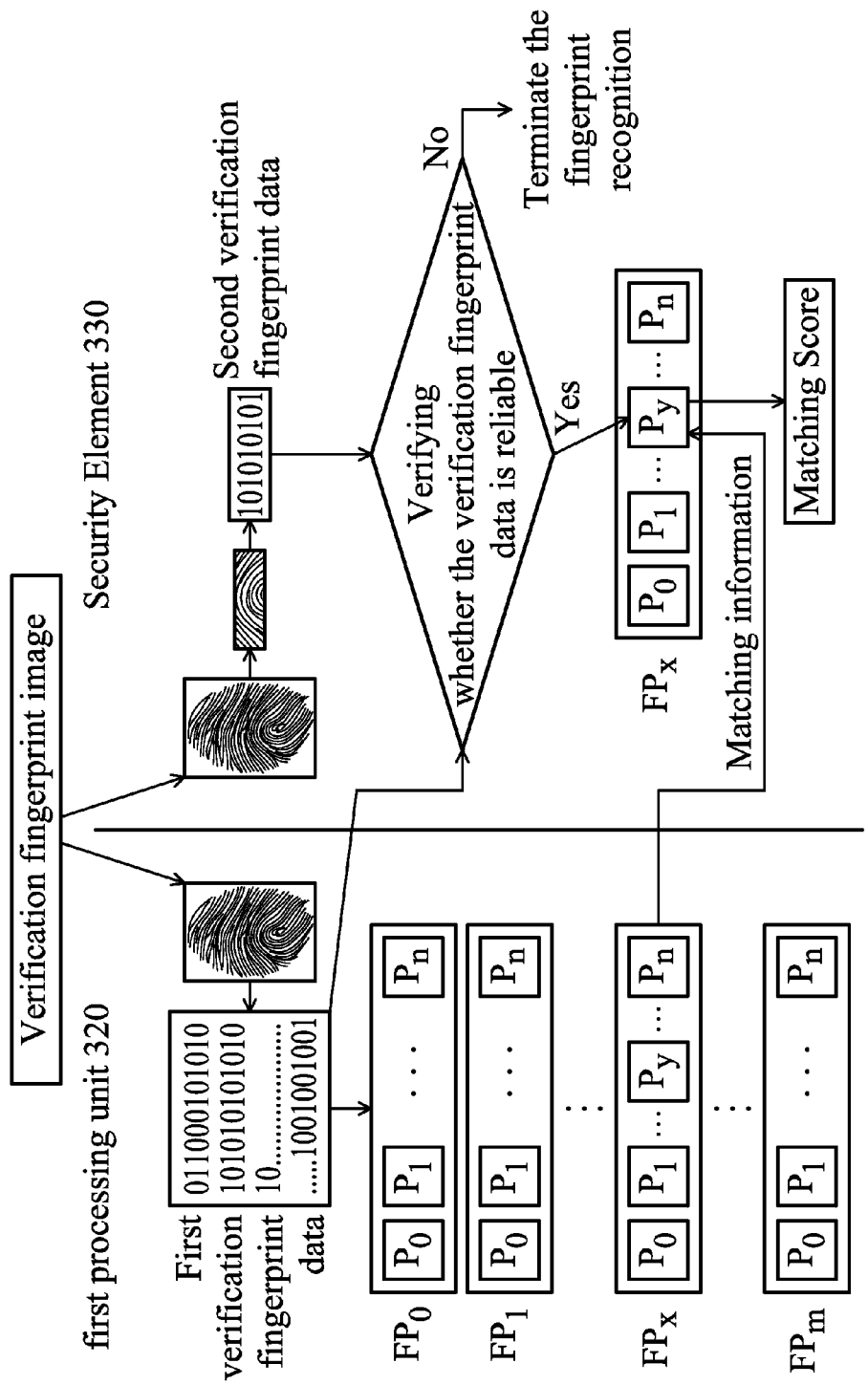
FIG. 4 is a schematic diagram of a fingerprint recognition scheme for a Security Element according to another embodiment of the invention.

If the first verification fingerprint data is reliable, the second processing unit will transmit the registered fingerprint datasets stored in the second storage unit 332 to the first processing unit 320. Then, the first processing unit 320 compares the first verification fingerprint data with the plurality of registered fingerprint datasets to find a matching fingerprint template from the plurality of registered fingerprint datasets. Then, the first processing unit 320 will transmit the matching information corresponding to the matching fingerprint template to the second processing unit 331. The matching information may include information of rotation and offset between the verification fingerprint data and the matching fingerprint template. For example, as shown in FIG. 4, if the first verification fingerprint data is reliable, the first processing unit 320 will receive the registered fingerprint datasets $FP_0$, $FP_1$, ... $FP_m$ from the second processing unit 331 and compare the first verification fingerprint data to the registered fingerprint datasets $FP_0$, $FP_1$, ... $FP_m$. Each registered fingerprint dataset $FP_k$ (k=0~m) corresponds to one finger and each registered fingerprint dataset $FP_k$ comprises a plurality of fingerprint templates $p_0$, $p_1$, ... $p_n$, wherein n indicates the number of the fingerprint templates in each registered fingerprint dataset $FP_k$. After comparing the first verification fingerprint data to the registered fingerprint datasets $FP_0$, $FP_1$, ... $FP_m$, the first processing unit 320 finds that the fingerprint template $p_y$ included in the registered fingerprint dataset $FP_x$ matches the first verification fingerprint data. Then, the first processing unit 320 will transmit the matching information corresponding to the matching fingerprint template $p_y$ to the second processing unit 331. The matching information comprises the index of the matching fingerprint template $p_y$ included in the registered fingerprint dataset $FP_x(x)$ and the matching details of the matching fingerprint template $p_y$, such as the offset information and rotation information between the first verification fingerprint data and matching fingerprint template $p_y$.

When the second processing unit 331 receives the matching information, the second processing unit 331 will compare the first verification fingerprint data with the matching fingerprint template $p_y$ according to the matching information corresponding to the matching fingerprint template $p_y$ so as to generate a matching score. Then, the second processing unit 331 determines whether the matching score is greater than a threshold. The second processing unit 331 will determine that the verification fingerprint is verified, if the matching score is greater than the threshold. The second processing unit 331 will determine that the verification fingerprint is not verified if the matching score is less than the threshold.

Because the second processing unit 331 has verified the first verification fingerprint data and obtained the matching information which identifies the matching fingerprint template $p_y$, the second processing unit 331 doesn't need to compare the verification fingerprint data with other fingerprint templates (e.g. $p_0$, $p_1$) in the registered fingerprint dataset $FP_x$ and the fingerprint templates in other registered fingerprint datasets (e.g. $FP_0$, $FP_1$, $FP_m$). Therefore, the security and liability of fingerprint recognition can be promoted since the matching score (i.e. matching result) is provided by Security Element 330, the high security environment.

Figure 5A:
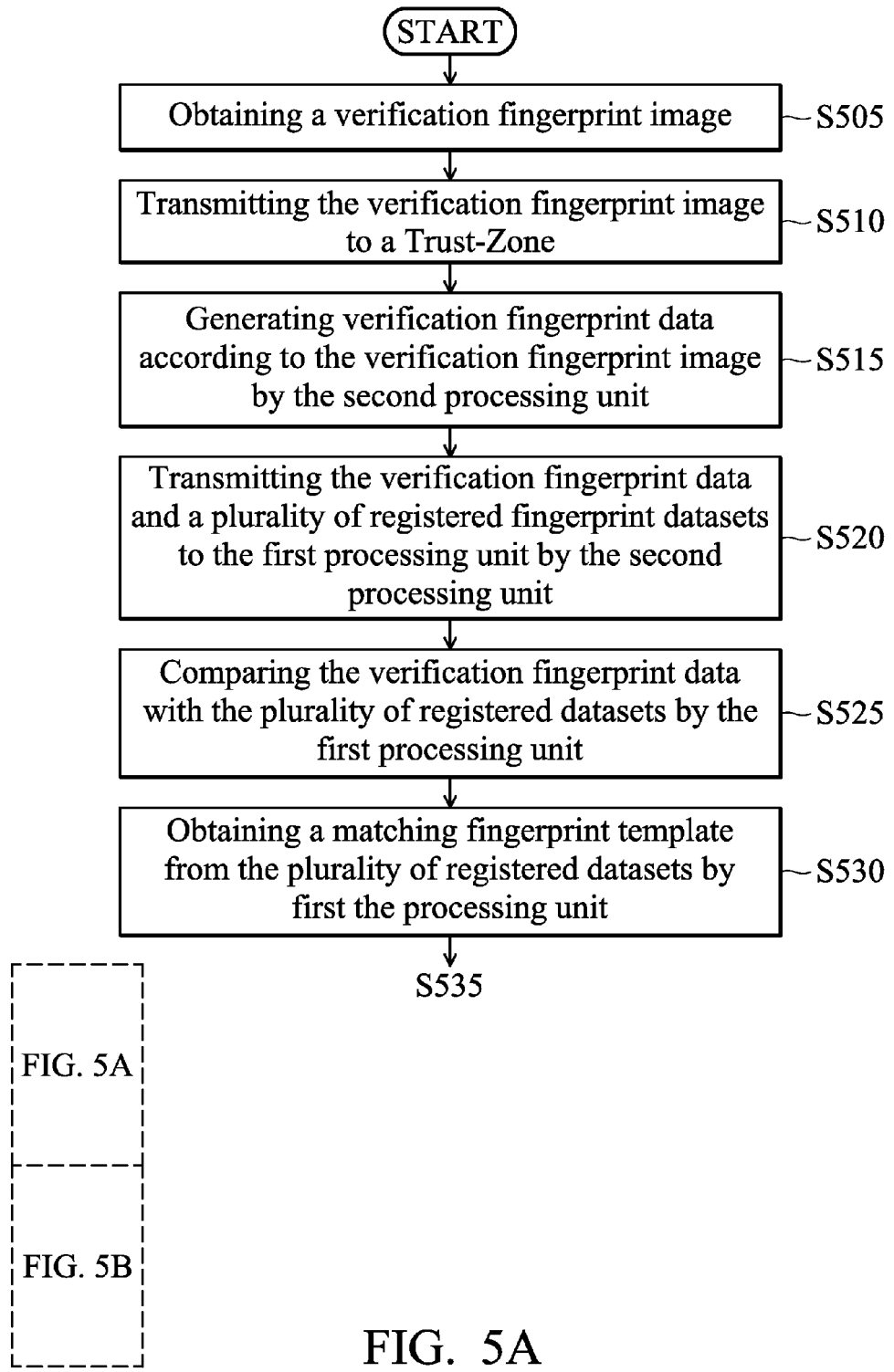
FIG. 5A-5B are flow charts illustrating a fingerprint recognition method according to an embodiment of the invention.
Figure 5B:
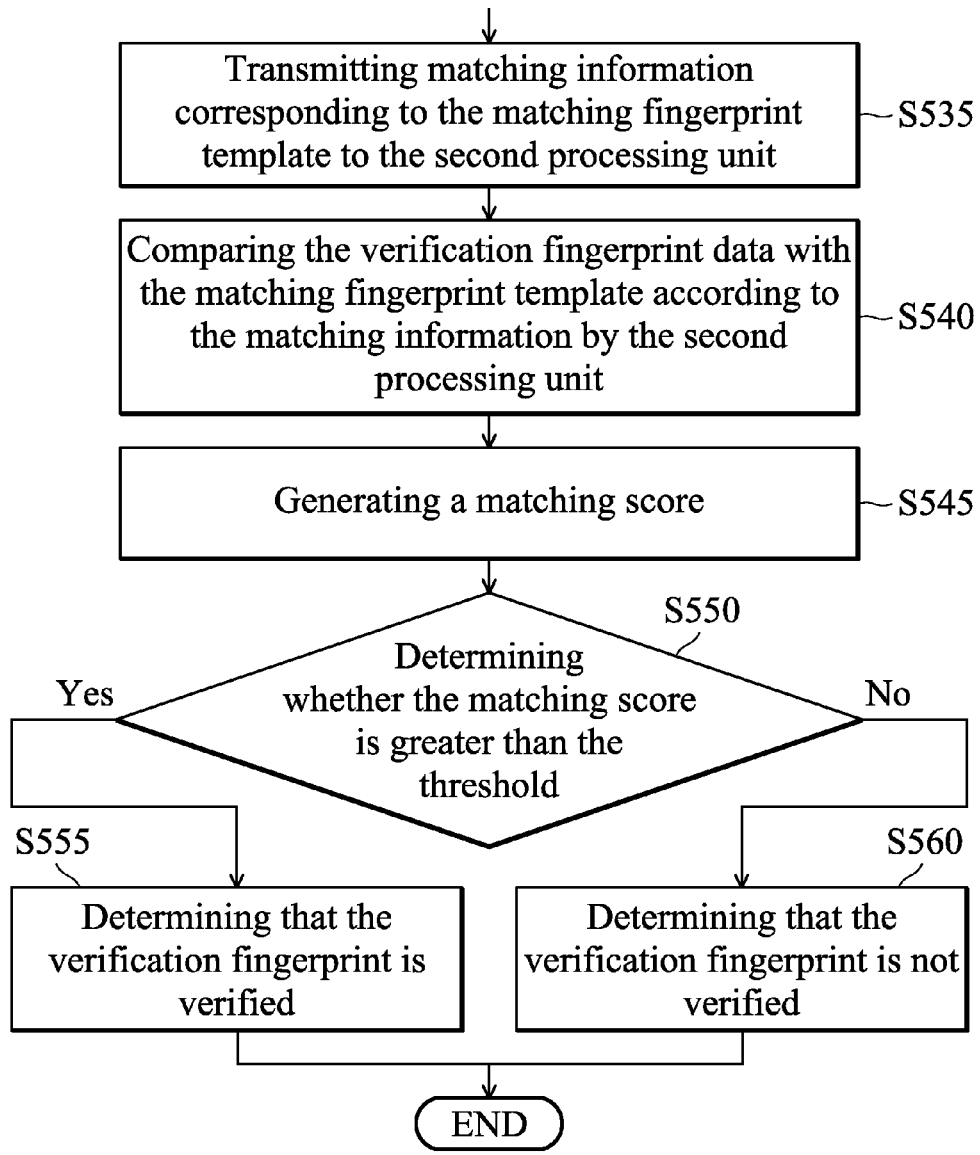

FIGS. 5A-5B is a flow chart illustrating a fingerprint recognition method according to an embodiment of the invention. The fingerprint recognition method is applied to the electronic device 100. As shown in FIGS. 5A-5B, in step S505, a verification fingerprint image is obtained by the fingerprint sensor 110. In step S510, the verification fingerprint image is transmitted to the Trust-Zone 130. In step S515, the verification fingerprint data is generated according to the verification fingerprint image by the second processing unit 131. In step S520, the verification fingerprint data and a plurality of registered fingerprint datasets are transmitted to the first processing unit 120 by second processing unit 131. In step S525, the verification fingerprint data is compared with the plurality of registered fingerprint datasets by the first processing unit 120. In step S530, a matching fingerprint template is obtained from the plurality of registered fingerprint datasets by the first processing unit 120.

In step S535, the matching information corresponding to the matching fingerprint template is transmitted to the second processing unit 131 by the first processing unit 120. In step S540, the verification fingerprint data is compared with the matching fingerprint template by the second processing unit 131 according to the matching information. In step S545, a matching score is generated by the second processing unit 131 after comparing the verification fingerprint data with the matching fingerprint template.

In step S550, the matching score is compared with a threshold by the second processing unit 131 to determine whether the matching score is greater than the threshold. In step S555, if the matching score is greater than a threshold, the second processing unit 131 determines that the verification fingerprint is verified. In step S560, if the matching score is less than a threshold, the second processing unit 131 determines that the verification fingerprint is not verified.

Figure 6A:
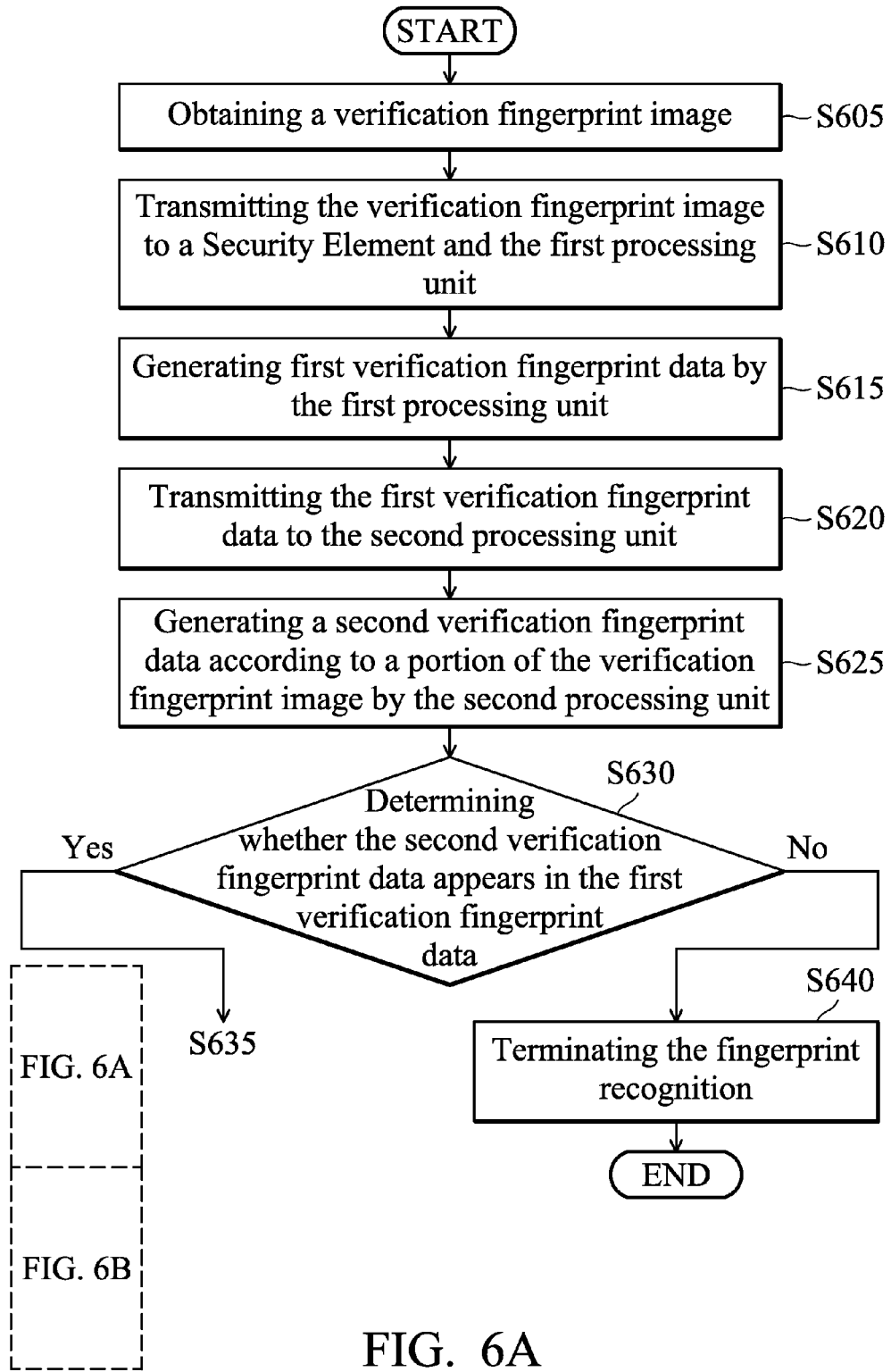
FIG. 6A-6B are flow charts illustrating a fingerprint recognition method according to another embodiment of the invention.
Figure 6B:
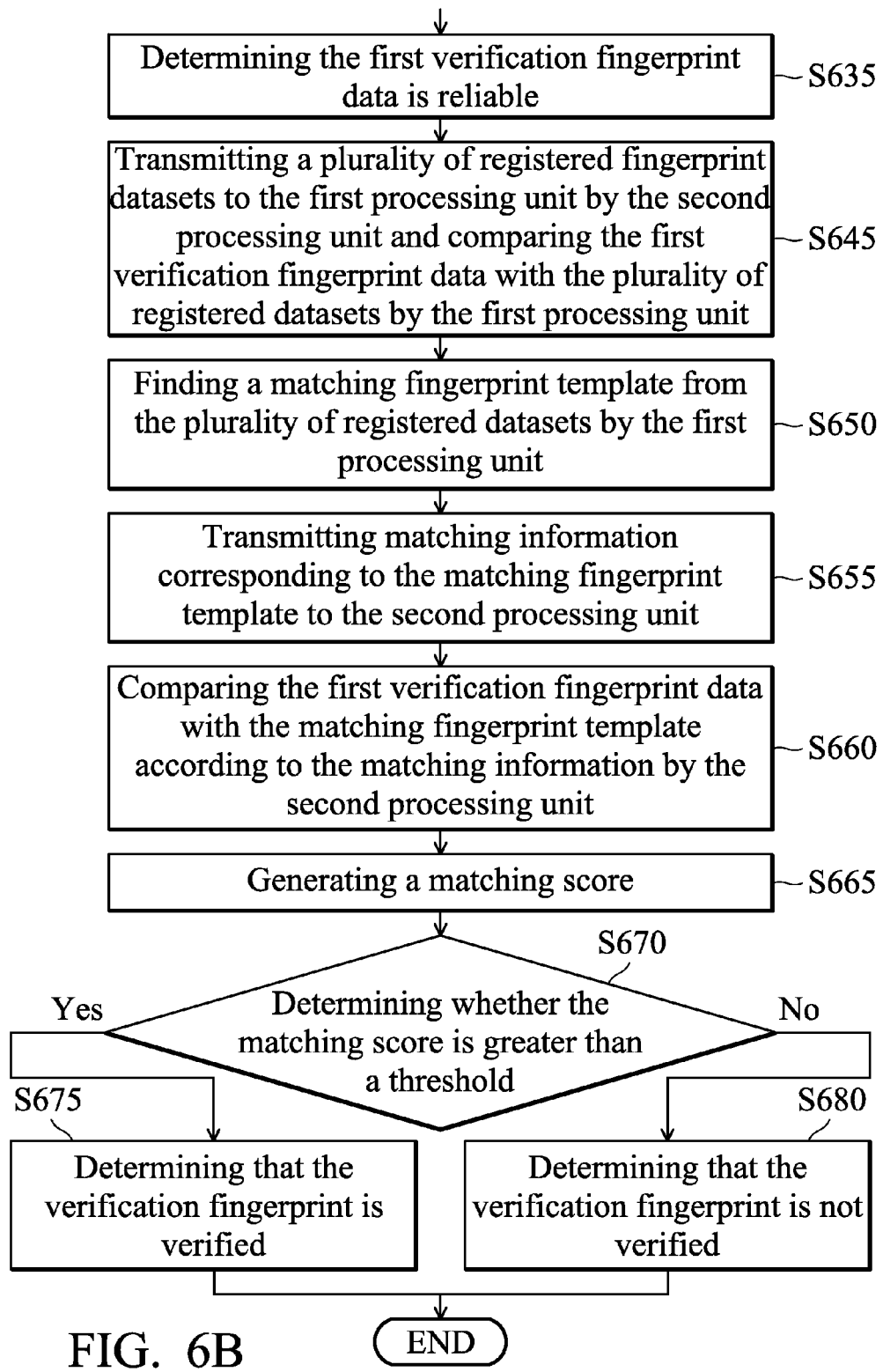

FIGS. 6A-6B is a flow chart illustrating a fingerprint recognition method according to another embodiment of the invention. The fingerprint recognition method is applied to the electronic device 300. As shown in FIGS. 6A-6B, in step S605, a verification fingerprint image is obtained by the fingerprint sensor 310. In step S610, the verification fingerprint image is transmitted to the Security Element 300 and the first processing unit 320. In step S615, a first verification fingerprint data is generated according to the verification fingerprint image by the first processing unit 320. In step S620, the first verification fingerprint data is transmitted to the second processing unit 331 by the first processing unit 320. In step S625, a second verification fingerprint data is generated according to a portion of the verification fingerprint image by the second processing unit 331.

In step S630, the second verification fingerprint data is compared with the first verification fingerprint data by the second processing unit 331 to determine whether the second verification fingerprint data appears in the first verification fingerprint data. In step S635, if the second verification fingerprint data appears in the first verification fingerprint data, the second processing unit 331 determines that the first verification fingerprint data is reliable. In step S640, if the second verification fingerprint data does not appear in the first verification fingerprint data, the fingerprint recognition is terminated.

In step S645, a plurality of registered fingerprint datasets are transmitted to the first processing unit 320 by the second processing unit 331, and the first verification fingerprint data is compared with the plurality of registered fingerprint datasets by the first processing unit 320. In step S650, a matching fingerprint template is found from the plurality of registered fingerprint datasets by the first processing unit 320. In step S655, the matching information that corresponds to the matching fingerprint template is transmitted to the second processing unit 331.

In step S660, the first verification fingerprint data is compared with the matching fingerprint template by the second processing unit 331 according to the matching information. In step S665, a matching score is generated by the second processing unit 331 after comparing the first verification fingerprint data with the matching fingerprint template. In step S670, the matching score is compared with a threshold by the second processing unit 331 to determine whether the matching score is greater than a threshold. In step S675, if the matching score is greater than the threshold, the second processing unit 331 determines that the verification fingerprint is verified. In step S680, if the matching score is less than the threshold, the second processing unit 331 determines that the verification fingerprint is not verified.

Figure 7:
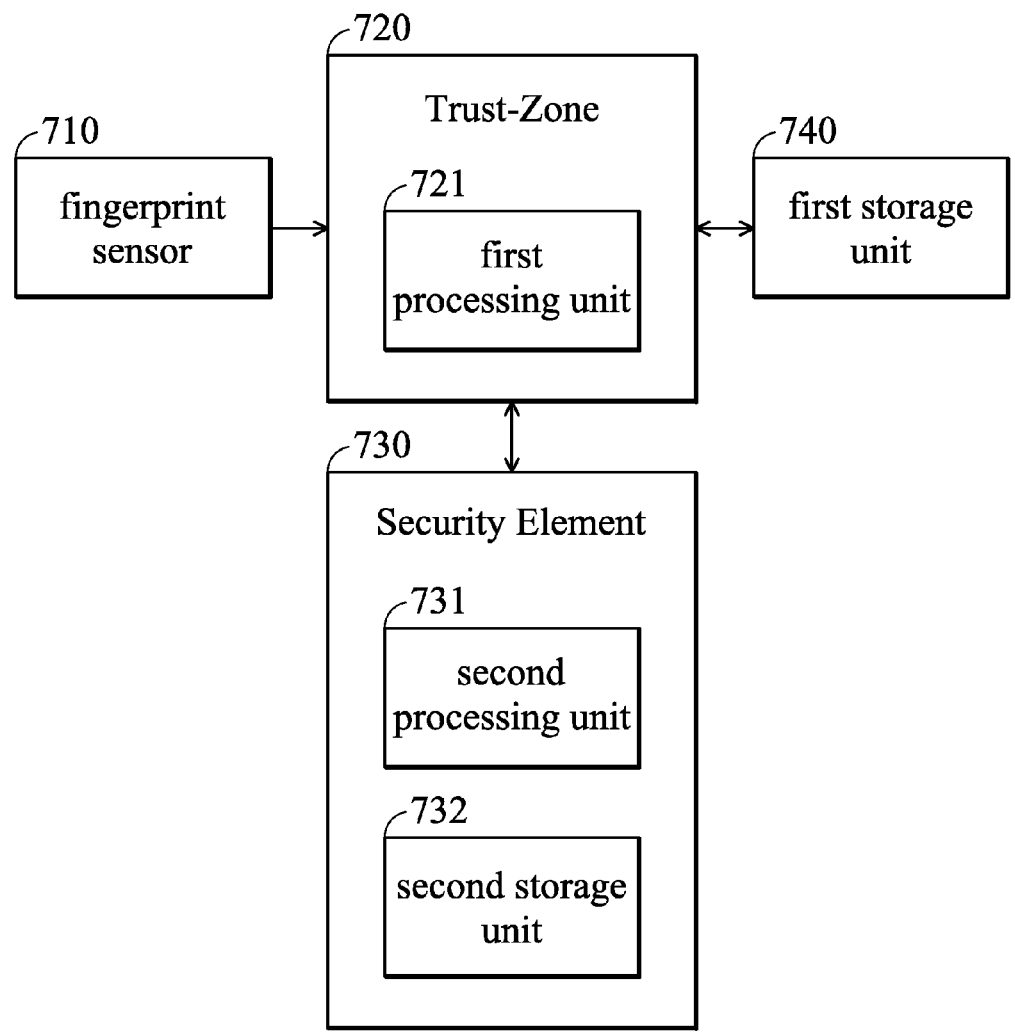
FIG. 7 is a block diagram illustrating an electronic device 700 according to an embodiment of the invention.

FIG. 7 is a block diagram illustrating an electronic device 700 according to an embodiment of the invention. As shown in FIG. 7, the electronic device 700 comprises a fingerprint sensor 710, a Trust-zone 720, a Security Element 730, and a first storage unit 740. FIG. 7 presents a simplified block diagram in which only the elements relevant to the invention are shown. However, the invention should not be limited to what is shown in FIG. 7.

In an embodiment of the invention, the Trust-zone 720 comprises a first processing unit 721. The Trust-zone 720 is coupled with the fingerprint sensor 710, the Security Element 730 and the storage unit 740.

In an embodiment of the invention, the storage unit 740 may be a non-volatile memory (e.g. flash memory) which includes one or more fingerprint databases recording fingerprint information of a user, e.g. a plurality of registered fingerprint datasets.

In an embodiment of the invention, in FIG. 7, the Security Element 730 comprises a second processing unit 731 and a second storage unit 732. The second processing unit 731, for example, may be a central processing unit (CPU) or a microcontroller. The second storage unit 732 may be a non-volatile memory (i.e. flash memory) which includes one or more fingerprint databases recording fingerprint information.

In an embodiment of the invention, the first processing unit 721 may divide each of the registered fingerprint datasets into a first part registered fingerprint dataset and a second part registered fingerprint dataset. Then, the first processing unit 721 stores the first part registered fingerprint datasets in the second storage unit 732 and stores the second part registered fingerprint datasets in the first storage unit 740.

Figure 8:
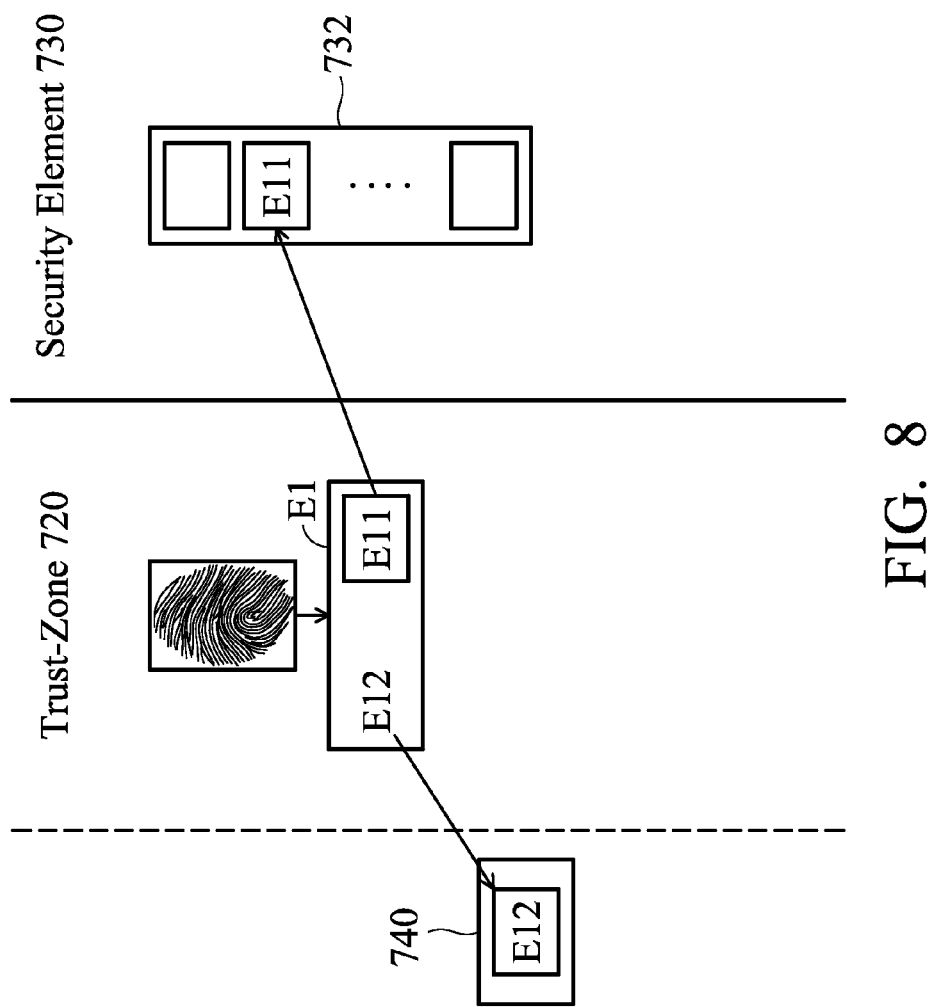
FIG. 8 is a schematic diagram of a fingerprint recognition scheme for generating registered fingerprint datasets according to an embodiment of the invention.

For example, as shown in FIG. 8 when the first processing unit 721 generates the registered fingerprint dataset E1 according to the fingerprint image obtained from the fingerprint sensor 710. The first processing unit 721 may divide the registered fingerprint dataset E1 into two parts: a first part registered fingerprint dataset E11 and a second part registered fingerprint dataset E12. Then, the first processing unit 721 may store the first part registered fingerprint dataset E11 in the second storage unit 732 and store the second part registered fingerprint dataset E12 in the first storage unit 740.

When fingerprint recognition is performed, the first processing unit 721 may obtain the first part registered fingerprint datasets from the second storage unit 732 and obtain the second part registered fingerprint datasets from the first storage unit 740 to obtain the complete registered fingerprint datasets. In addition, for fingerprint recognition, the user has to swipe or press his or her finger over or on the sensing area of the fingerprint sensor 710. After the user swipes or presses his or her finger over or on the sensing area of the fingerprint sensor 710, the fingerprint sensor 710 will sense a verification fingerprint image and the verification fingerprint image will be transmitted to the first processing unit 721. After obtaining the verification fingerprint image, the first processing unit 721 will generate verification fingerprint data according to the verification fingerprint image, and then the first processing unit 721 will divide the verification fingerprint data into a first part verification fingerprint data and a second part verification fingerprint data.

Then, the first processing unit 721 compares the verification fingerprint data with the registered fingerprint datasets to obtain a matching fingerprint template from the plurality of registered fingerprint datasets and generate a first matching result and matching information. In an embodiment of the invention, the matching information comprises an index corresponding to the matching fingerprint template included in the registered fingerprint datasets and matching details between the verification fingerprint data and the matching fingerprint template, wherein the matching details comprise offset information and rotation information between the verification fingerprint data and the matching fingerprint template. In an embodiment of the invention, the first matching result may comprise two parts, wherein one part corresponds to the first part verification fingerprint data and the first part registered fingerprint dataset of the matching fingerprint template, and the other part corresponds to the second part verification fingerprint data and the second part registered fingerprint dataset of the matching fingerprint template. In an embodiment of the invention, the first part of the first matching result may comprise the first matching score between the first part verification fingerprint data and the first part registered fingerprint dataset of the matching fingerprint template and the second part of the first matching result may comprise the second matching score between the second part verification fingerprint data and the second part registered fingerprint dataset of the matching fingerprint template.

After generating the first matching result and the matching information, the first processing unit 721 will transmit the first part of the first matching result, the first part verification fingerprint and the matching information to the second processing unit 731. The second processing unit 731 compares the first part verification fingerprint data with one of the first part registered fingerprint datasets according to the matching information to generate a second matching result. After obtaining the second matching result, the second processing unit 731 compares the first part of the first matching result (e.g. first matching score) with the second matching result. The second processing unit 731 will determine that the verification fingerprint is verified if the first part of the first matching result is the same as the second matching result. The second processing unit 731 will determine that the verification fingerprint is not verified if the first part of the first matching result is different from the second matching result.

Figure 9A:
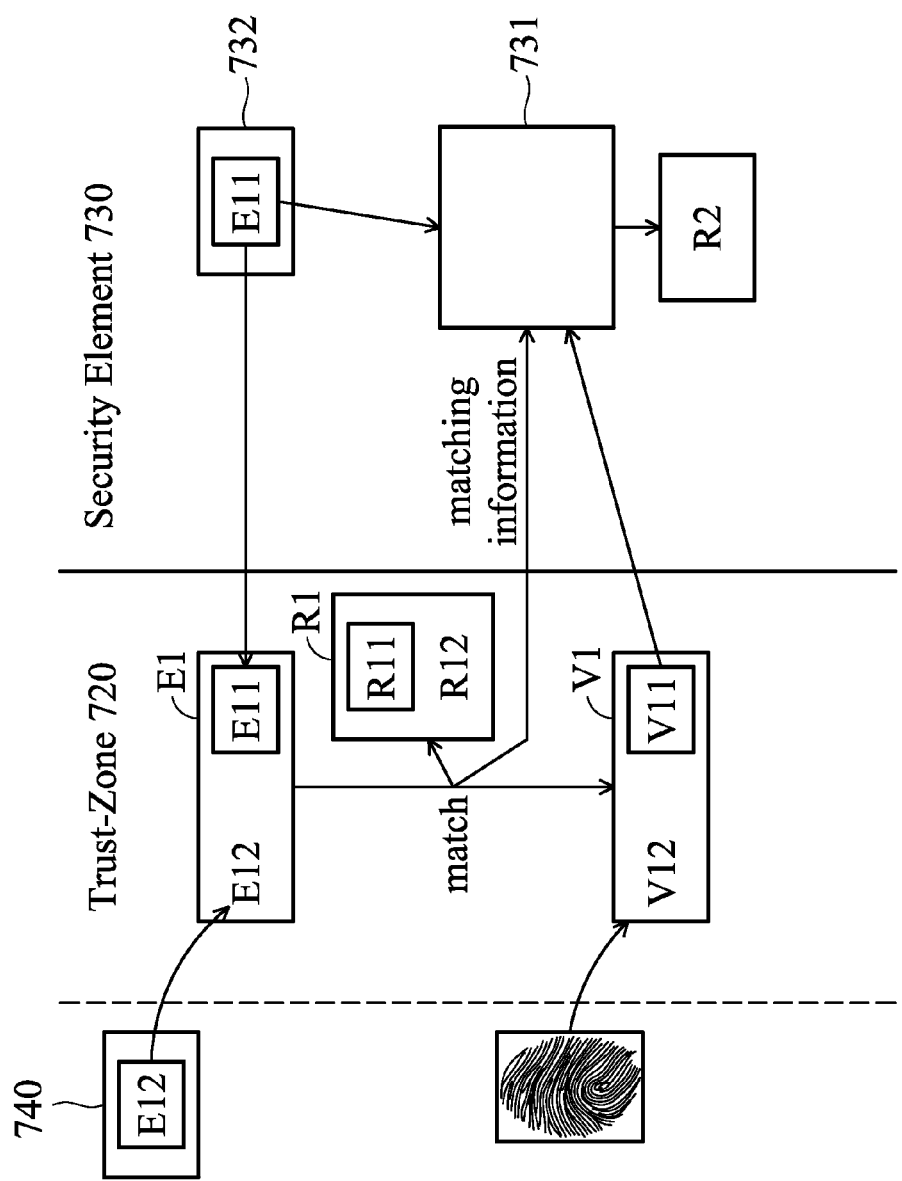
FIGS. 9A-9B are schematic diagrams of a fingerprint recognition scheme according to another embodiment of the invention.
Figure 9B:
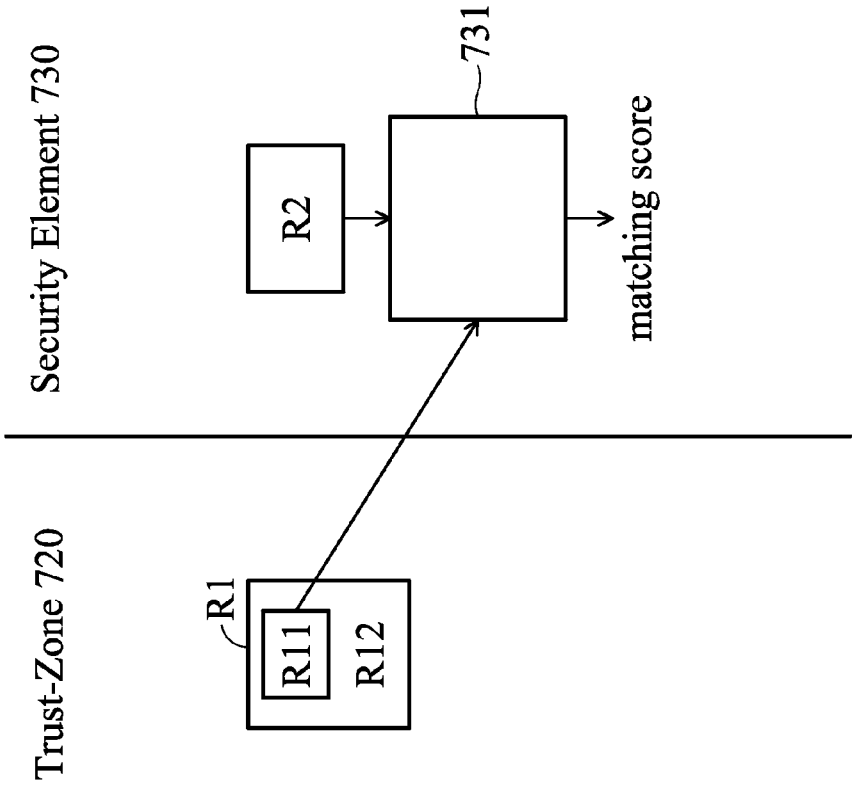

As shown in FIGS. 9A and 9B, when fingerprint recognition is performed, the first processing unit 721 may obtain all of the first part registered fingerprint datasets from the second storage unit 732 and obtain all of the second part registered fingerprint datasets from the first storage unit 740 to obtain the complete registered fingerprint datasets (e.g. the first part registered fingerprint dataset E11 is obtained from the second storage unit 732 and the second part registered fingerprint dataset E12 is obtained from the second storage unit 740). Then, the first processing unit 721 will generate verification fingerprint data V1 according to the verification fingerprint image from the fingerprint sensor 710, and then the first processing unit 721 will divide the verification fingerprint data V1 into first part verification fingerprint data V11 and second part verification fingerprint data V12. Then, the first processing unit 721 compares the verification fingerprint data with the registered fingerprint datasets to obtain a matching fingerprint template (i.e. registered fingerprint dataset E1) from the plurality of registered fingerprint datasets and generate a first matching result R1 and matching information between the verification fingerprint data V1 and the registered fingerprint dataset E1. The first matching result R1 comprises first part R11 corresponding to the first part verification fingerprint data V11 and the first part registered fingerprint dataset E11 of the registered fingerprint dataset E1, and the second part R12 corresponding to the second part verification fingerprint data V12 and the second part registered fingerprint dataset E12 of the registered fingerprint dataset E1. After generating the first matching result R1 and the matching information, the first processing unit 721 will transmit the first part of the first matching result R1 (i.e. R11), the first part verification fingerprint V11 and the matching information corresponding to the verification fingerprint data V1 and the registered fingerprint datasets E1 to the second processing unit 731. Then, the second processing unit 731 compares the first part verification fingerprint data V11 with the first part registered fingerprint dataset E11 to generate a second matching result R2 according to the matching information.

As shown in FIG. 9B, after obtaining the second matching result R2, the second processing unit 731 compares the first part R11 of the first matching result R1 with the second matching result R2. If the first part R11 of the first matching result R1 is the same as the second matching result R2, the second processing unit 731 will determine that the verification fingerprint is verified. If the first part R11 of the first matching result R1 is different from the second matching result R2, the second processing unit 731 will determine that the verification fingerprint has failed to be verified.

In an embodiment of the invention, the first processing unit further determines whether to store the first part verification fingerprint data of the verification fingerprint data in the second storage unit 732 and store the second part verification fingerprint data of the verification fingerprint data in the first storage unit 740 to update the registered fingerprint datasets after the verification fingerprint data is verified. Namely, the verification fingerprint data will be indicated as a registered fingerprint dataset.

Figure 10:
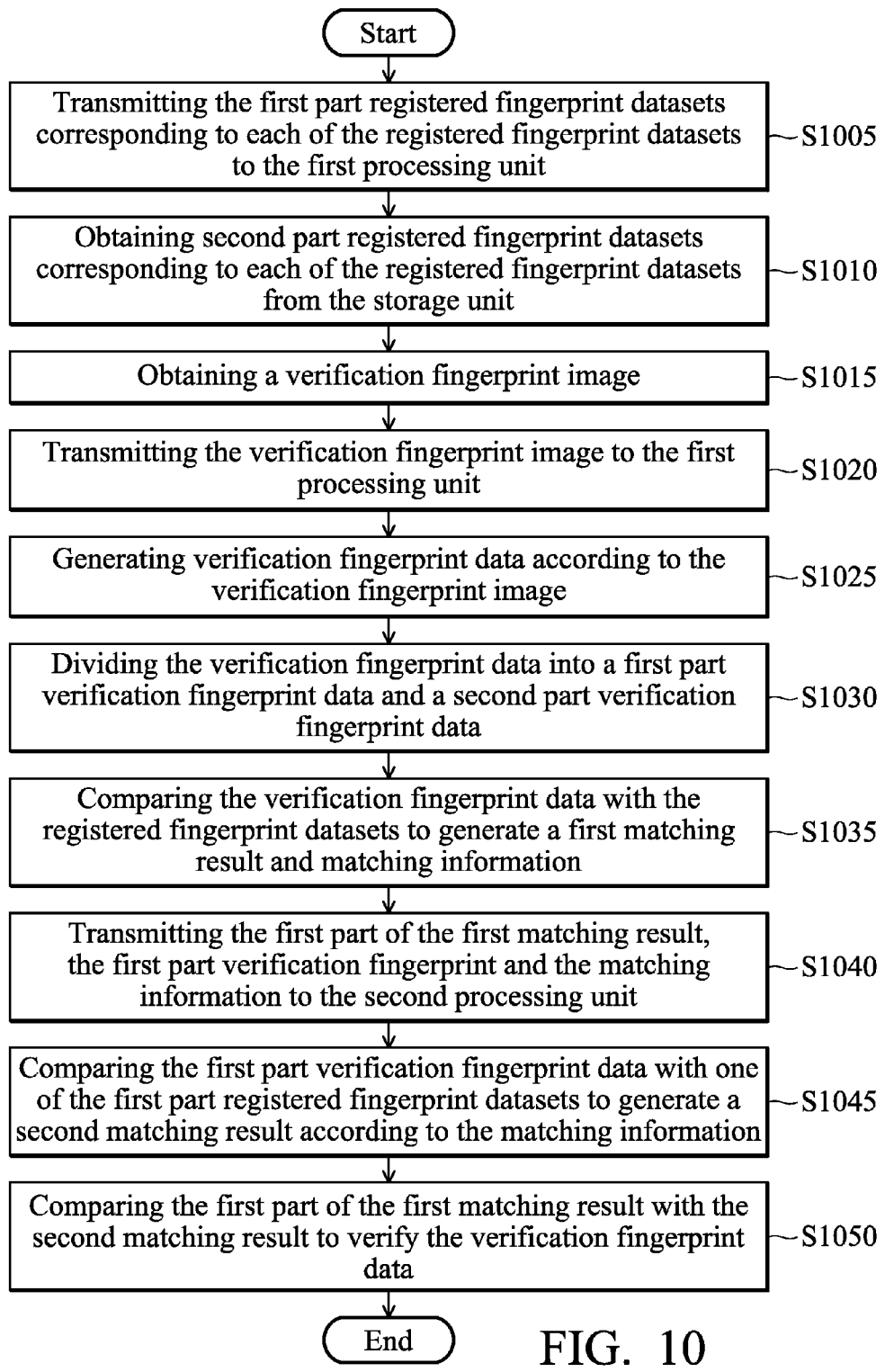
FIG. 10 is a flow chart illustrating a fingerprint recognition method according to another embodiment of the invention.

FIG. 10 is a flow chart illustrating a fingerprint recognition method according to another embodiment of the invention. The fingerprint recognition method is applied to the electronic device 700. As shown in FIG. 10, in step S1005, the second processing unit 730 transmits first part registered fingerprint datasets corresponding to each of the registered fingerprint datasets to the first processing unit 721. In step S1010, the first processing unit 721 obtains second part registered fingerprint datasets corresponding to each of the registered fingerprint datasets from the storage unit 740. In step S1015, the fingerprint sensor 710 obtains a verification fingerprint image. In step S1020, the fingerprint sensor 710 transmits the verification fingerprint image to the first processing unit 721. In step S1025, the first processing unit 721 generates verification fingerprint data according to the verification fingerprint image. In step S1030, the first processing unit 721 divides the verification fingerprint data into a first part verification fingerprint data and a second part verification fingerprint data. In step S1035, the first processing unit 721 compares the verification fingerprint data with the registered fingerprint datasets to generate a first matching result and matching information. In step S1040, the first processing unit 721 transmits the first part of the first matching result, the first part verification fingerprint and the matching information to the second processing unit 731.

In step S1045, the second processing unit 731 compares the first part verification fingerprint data with one of the first part registered fingerprint datasets to generate a second matching result according to the matching information. In step S1050, the second processing unit 731 compares the first part of the first matching result with the second matching result to verify the verification fingerprint data. If the first part of the first matching result is the same as the second matching result, the second processing unit 731 will determine that the verification fingerprint is verified. If the first part of the first matching result is different from the second matching result, the second processing unit 731 will determine that the verification fingerprint is not verified.

In the embodiment of the invention, the method further comprises the following steps; the first processing unit 721 divides each of the registered fingerprint datasets into first part registered fingerprint datasets and the second part registered fingerprint datasets, wherein the first processing unit 721 stores the first part registered fingerprint datasets in the Security Element 730 and stores the second part registered fingerprint datasets in the storage unit 740.

In the embodiment of the invention, the method further comprises the step of obtaining a matching fingerprint template from the plurality of registered fingerprint datasets by the first processing unit 721. In the embodiment of the invention, the matching information comprises an index corresponding to the matching fingerprint template included in the registered fingerprint datasets and matching details between the verification fingerprint data and the matching fingerprint template, wherein the matching details comprise offset information and rotation information between the verification fingerprint data and the matching fingerprint template.

In the embodiment of the invention, the method further comprises the step of determining whether to store the first part verification fingerprint data of the verification fingerprint data in the second storage unit 732 of the Security Element 730 and store the second part verification fingerprint data of the verification fingerprint data in the first storage unit 740 to update the registered fingerprint datasets after the verification fingerprint data is verified.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

Reference throughout this specification to "one embodiment" or "an embodiment" means that a particular feature, structure, or characteristic described in connection with the embodiment is included in at least one embodiment of the invention, but do not denote that they are present in every embodiment. Thus, the appearances of the phrases "in one embodiment" or "in an embodiment" in various places throughout this specification are not necessarily referring to the same embodiment of the invention.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects of the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A fingerprint-recognition method, applied to an electronic device, the electronic device comprising a storage unit, a Trust-Zone comprising a first processing unit and a Security Element comprising a second processing unit, the fingerprint-recognition method comprising:

transmitting first part registered fingerprint datasets to the first processing unit by the second processing unit;

obtaining second part registered fingerprint datasets from the storage unit by the first processing unit;

obtaining complete registered fingerprint datasets according to the first part registered fingerprint datasets and the second part registered fingerprint datasets;

obtaining a verification fingerprint image;

transmitting the verification fingerprint image to the first processing unit;

generating verification fingerprint data according to the verification fingerprint image by the first processing unit;

dividing the verification fingerprint data into first part verification fingerprint data and second part verification fingerprint data;

comparing the verification fingerprint data with the complete registered fingerprint datasets to generate a first matching result and matching information by the first processing unit;

transmitting a first part of the first matching result, the first part verification fingerprint data and the matching information from the first processing unit to the second processing unit;

comparing the first part verification fingerprint data with one of the first part registered fingerprint datasets to generate a second matching result by the second processing unit according to the matching information; and comparing the first part of the first matching result and the second matching result so as to verify the verification fingerprint data by the second processing unit.

2. The fingerprint recognition method of claim 1, further comprising:

obtaining a plurality of fingerprint images;

generating the complete registered fingerprint datasets according to the fingerprint images by the first processing unit;

dividing each of the complete registered fingerprint datasets into the first part registered fingerprint datasets and the second part registered fingerprint datasets;

storing the first part registered fingerprint datasets in the Security Element; and storing the second part registered fingerprint datasets in the storage unit.

3. The fingerprint recognition method of claim 1, further comprising:

obtaining a matching fingerprint template from the plurality of registered fingerprint datasets by the first processing unit.

4. The fingerprint recognition method of claim 3, wherein the matching information comprises an index corresponding to the matching fingerprint template included in the complete registered fingerprint datasets.

5. The fingerprint recognition method of claim 3, wherein the matching information comprises matching details between the verification fingerprint data and the matching fingerprint template, wherein the matching details comprise offset information and rotation information between the verification fingerprint data and the matching fingerprint template.

6. The fingerprint recognition method of claim 1, further comprising:

storing the first part verification fingerprint data of the verification fingerprint data in the Security Element and storing the second part verification fingerprint data of the verification fingerprint data in the storage unit after the verification fingerprint data is verified.

7. An electronic device, comprising:

a fingerprint sensor, configured to obtain a verification fingerprint image;

a Trust-Zone, comprising:

a first processing unit, configured to receive the verification fingerprint image from the fingerprint sensor, generate verification fingerprint data according to the verification fingerprint image, and divide the verification fingerprint data into a first part verification fingerprint data and a second part verification fingerprint data;

a first storage unit, configured to store second part registered fingerprint datasets and provide the second part registered fingerprint datasets to the first processing unit; and a Security Element, comprising:

a second storage unit, configured to store first part registered fingerprint datasets; and a second processing unit, configured to transmit the first part registered fingerprint datasets to the first processing unit, wherein the first processing unit further obtains complete registered fingerprint datasets according to the first part registered fingerprint datasets and the second part registered fingerprint datasets wherein the first processing unit compares the verification fingerprint data with the complete registered fingerprint datasets to generate a first matching result and matching information and transmits a first part of the first matching result, the first part verification fingerprint and the matching information to the second processing unit, wherein the second processing unit compares the first part verification fingerprint data with one of the first part registered fingerprint datasets to generate a second matching result according to the matching information and compares the first part of the first matching result and the second matching result so as to verify the verification fingerprint data by the second processing unit.

8. The electronic device of claim 7, wherein the first processing unit further obtains a plurality of fingerprint images, generates the complete registered fingerprint datasets according to the fingerprint images, divides each of the complete registered fingerprint datasets into the first part registered fingerprint datasets and the second part registered fingerprint datasets, and stores the first part registered fingerprint datasets in the second storage unit, and stores the second part registered fingerprint datasets in the first storage unit.

9. The electronic device of claim 7, wherein the first processing unit further obtains a matching fingerprint template from the plurality of registered fingerprint datasets by the first processing unit.

10. The electronic device of claim 9, wherein the matching information comprises an index corresponding to the matching fingerprint template included in the complete registered fingerprint datasets.

11. The electronic device of claim 9, wherein the matching information comprises matching details between the verification fingerprint data and the matching fingerprint template, wherein the matching details comprise offset information and rotation information between the verification fingerprint data and the matching fingerprint template.

12. The electronic device of claim 7, wherein the first processing unit further stores the first part verification fingerprint data of the verification fingerprint data in the second storage unit and store the second part verification fingerprint data of the verification fingerprint data in the first storage unit after the verification fingerprint data is verified.

* * * * *